Sept. 29, 1931. C. R. BAKER 1,825,330
FILTERING
Filed Jan. 9, 1929
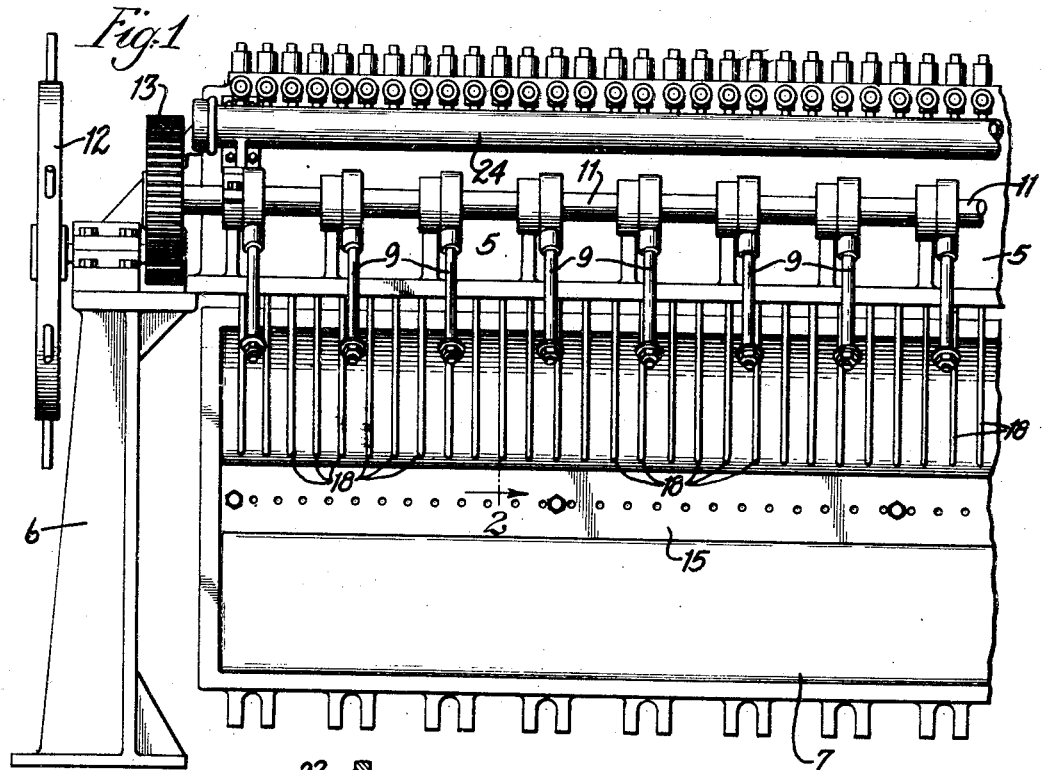
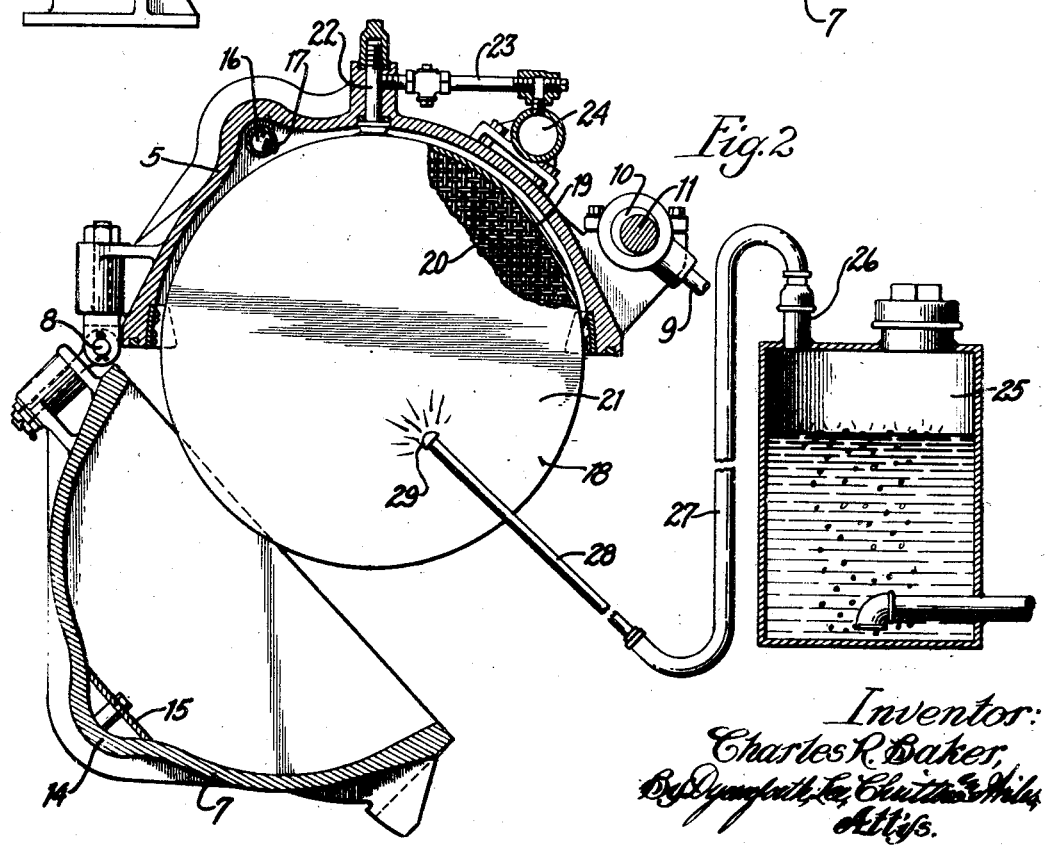
Inventor:
Charles R. Baker, Patented Sept. 29, 1931

1,825,330

UNITED STATES PATENT OFFICE

CHARLES R. BAKER, OF WOOD RIVER, ILLINOIS, ASSIGNOR TO STANDARD OIL COMPANY, OF WHITING, INDIANA, A CORPORATION OF INDIANA

FILTERING

Application filed January 9, 1929. Serial No. 331,216.

The present invention relates to improvements in the filtration of hydrocarbon oils, and more particularly to filtration operations in connection with the decolorizing of mineral oils with finely divided fuller's earth and like decolorizing materials. In order that the invention may be fully understood, it is illustrated in connection with a common commercial form of leaf filter having a hinged casing, although, as is obvious, other forms of filtration devices may be employed in carrying out the invention.

Referring to the drawings:

Figure 1 is a side elevation of a portion of a common commercial type of press, with the lower part of the casing dropped to open position; and Fig. 2 is a sectional view on the line 2 of the press of Fig. 1, likewise shown in open position, together with a spray device employed in carrying out the invention.

Referring more particularly to the drawings, the numeral 5 indicates the stationary upper portion of the casing of a filter press mounted on standards 6. The lower portion 7 of the casing is secured to the upper portion 5 by hinges 8 and during the filtration operation, the hinged movable portion 7 of the casing is held in locked position by the swing bolts 9 mounted on eccentrics 10 on the lock-shaft 11, locking being effected by means of the hand wheel 12 through gearing 13. The lower portion 7 of the casing is provided in the usual way with the drainage channel 14 and the distributing plate 15, through which feeding is ordinarily effected, and, if desired, in the upper portion of the casing the internal feeding manifold 16 with distributing nozzles 17 may also be provided.

The filter leaves 18 are made up, in the usual way, of an outer frame or rim 19, to each side of which is secured the wire screen or perforated support 20, to the outside of which the filter medium 21 is applied. The filter medium may suitably be textile cloth. The interiors of the leaves communicate with the discharge nozzles 22, and each discharge nozzle 22 is connected by outlet pipe 23 with the filtrate discharge manifold 24. Since the type of filter described is a common commercial form, a further detailed description thereof will not be given.

In the practice of decolorizing mineral oils, and particularly the more viscous lubricating oils by thoroughly mixing a finely divided decolorizing agent such as fuller's earth with the oil, which may previously have been treated with sulfuric acid, the oil is subsequently forced through a suitable filtering device, such as a filter of the type above described, to remove the decolorizing agent from the oil.

In accordance with the present invention, the filtration operation is markedly improved and the character of the oil resulting from the filtration is likewise improved by preliminarily applying to the filtering medium an extremely thin coating of finely divided inert filter-aiding solids, such as filter-cel, diatomaceous earth, fuller's earth, filter-clay or the like.

In carrying out the invention, the filter-aiding material, such as finely divided, purified diatomaceous earth is suspended in oil, for example, naphtha, mineral seal oil, or oil of the character of that to be submitted to filtration. This material, which may suitably be 80–300 mesh, is suspended in the oil in a fairly thin suspension; say one part of the filter-aiding material and four parts of oil by weight. The suspension may be painted upon the outer surfaces of the filtering medium on the filter leaves, or preferably sprayed upon them, for example, by such a device as that illustrated in Fig. 2 of the drawings. In that figure, the numeral 25 indicates a container for the suspension, provided with an outlet nozzle 26 to which is secured the flexible hose 27. To the end of this is secured a long pipe 28 provided at its end with an elbow nozzle 29. A current of compressed air is forced into the container 25 through the pipe 30. The entire device is portable, and the spray pipe 28 and nozzle 29 are hand operated to apply the suspension, driven out by the air blast, evenly over the filter medium. In this way, the filter-aiding material may be applied to the filtering medium very rapidly and in an even coating. The amount of filter-aiding material required is relatively small; for example, using a suspension applied as hereinbefore set forth, one pound of the filter-aiding material is sufficient to properly cover 240 to 250 square feet of the filtering medium.

In carrying out the invention, the filter-aiding material is applied as described to clean filters before filtration is begun, and preferably again after the removal of cake after each filtering operation. In many cases, two or more successive filtrations may be made before a preliminary coating of the filter-aiding material is again applied; but this is in general inadvisable, it being preferred to apply the filter-aiding material prior to each filtration operation.

The use of the present invention in connection with the filtration of decolorizing materials from hydrocarbon oils markedly increases the efficiency of the filter press, and prevents the cloudiness of the filtrate normally occurring during the first portion of each filtration operation after removing the filter cake from the preceding operation, this being the portion of the operation during which the rate of filtration is at its maximum. It likewise markedly facilitates the cleaning of the press, the filter cake being removed more easily after each filtering operation, and prevents leaking through the plates with resulting cloudiness and depreciation of the filtrate. It is likewise found that by the use of the present invention, the properties of the oil filtrate are improved, particularly as to emulsion test, color and clearness, and that there are improvements in its other chemical characteristics.

Although, for convenience, the invention has been described in connection with the operation of a leaf-type filter, it is readily apparent that it may be employed in connection with the use of other types of filters, such as the continuous disk or drum filters, or plate and frame presses.

I claim:

1. In the operation of filtering mineral oils admixed with finely dispersed decolorizing material, through a filter medium, the step of improving the operation which comprises preliminarily applying to the filtering surface of the filter medium, as a superficial non-permanent coating, a liquid suspension of finely divided filter-aiding material, said application being made prior to beginning filtration of the oil therethrough and while both sides of the filter medium are under substantially the same pressure.

2. In the art of filtering mineral oils containing finely dispersed decolorizing material by passing such oil through a sheet filter element and into the interior of a filter leaf to which said sheet filter is secured, the step of improving the operation which comprises preliminarily applying to the exterior surface of said sheet filter element, as a superficial non-permanent coating, a liquid suspension of finely divided filter-aiding material prior to beginning filtration of the oil therethrough and while the interior and exterior of the filter leaf are under atmospheric pressure.

3. In the art of filtering lubricant mineral oils admixed with finely divided decolorizing material wherein such oil is forced through a filtering medium, a body of decolorizing material collecting on the filter medium as a filter cake, and removed therefrom, and the succession of operations repeated, the step of applying to the filtering surface of said filter medium, as a superficial non-permanent coating, a suspension in oil of finely divided filter-aiding material, after removal of the cake therefrom and before again forcing the oil to be filtered therethrough, said coating application being made while both sides of said filtering medium are under substantially the same pressure.

CHARLES R. BAKER.